United States Patent
Saitoh

(10) Patent No.: US 8,184,246 B2
(45) Date of Patent: May 22, 2012

(54) TRANSPARENT FILM, POLARIZING PLATE, AND LIQUID CRYSTAL DISPLAY DEVICE

(75) Inventor: Yukito Saitoh, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 1130 days.

(21) Appl. No.: 11/940,633

(22) Filed: Nov. 15, 2007

(65) Prior Publication Data

US 2008/0137191 A1    Jun. 12, 2008

(30) Foreign Application Priority Data

Nov. 16, 2006 (JP) ................................ 2006-309949
Sep. 3, 2007   (JP) ................................ 2007-227346

(51) Int. Cl.
*G02F 1/1335* (2006.01)

(52) U.S. Cl. ............ 349/118; 428/1.1; 428/1.3; 349/96; 349/117; 349/120

(58) Field of Classification Search .................. 349/118, 349/117, 120, 8, 96; 428/1.1, 1.3, 1.33; 359/497; 539/486.03, 489.02
See application file for complete search history.

(56) References Cited

U.S. PATENT DOCUMENTS

2008/0192184 A1 *  8/2008  Tan et al. ......................... 349/96
2008/0252800 A1 * 10/2008  Tan et al. ........................... 349/8

FOREIGN PATENT DOCUMENTS

| JP | 2001-350022 A | 12/2001 |
| JP | 2008-509425 A | 3/2008 |
| WO | WO 2006/025474 A1 | 3/2006 |

OTHER PUBLICATIONS

J. Opt. Soc. Am. A/vol. 13, No. 5/May 1996 Interpretation of Mueller matrices based on polar decomposition.*
Takahashi, Y. et al., "Depth-Dependent Determination of Molecular Orientation for WV-Film", Japanese Liquid Crystal Society, Sep. 26, 2004, pp. 194-195.
Office Action dated Aug. 9, 2011, issued in corresponding Japanese Patent Application No. 2007-227346, and an English translation thereof.

* cited by examiner

*Primary Examiner* — Angela Ortiz
*Assistant Examiner* — Ruiyun Zhang
(74) *Attorney, Agent, or Firm* — Buchanan Ingersoll & Rooney PC

(57) ABSTRACT

A transparent film is disclosed. The film comprises a domain in which the Nz value in the normal direction of the film surface shows monotonous increase from 0 to 1 or monotonous decrease from 1 to 0, and having an in-plane retardation Re at a wavelength of 550 nm falling within the range from 510 to 610 nm, provided that Nz is defined as $Nz=0.5+Rth(550)/Re(550)$, where $Rth(550)$ and $Re(550)$ respectively indicate a thickness-direction retardation and an in-plane retardation at a wavelength of 550 nm.

4 Claims, 3 Drawing Sheets

TRANSPARENT FILM, POLARIZING PLATE, AND LIQUID CRYSTAL DISPLAY DEVICE

CROSS-REFERENCE TO RELATED APPLICATIONS

This application claims benefit of priority under 35 U.S.C. 119 to Japanese Patent Application Nos. 2006-309949 filed Nov. 16, 2006 and 2007-227346 filed Sep. 3, 2007, and the entire contents of the applications are incorporated herein by reference.

BACKGROUND OF THE INVENTION

1. Field of the Invention

The present invention relates to a novel transparent film usable as an optically-compensatory film in liquid-crystal devices and as a protective film in polarizing plates, and also to a polarizing plate and a liquid-crystal display device comprising the transparent film.

2. Related Art

A transmissive-type liquid-crystal display device has a liquid-crystal cell and a pair of polarizing elements each of which is disposed either of sides of the cell. In general, the polarizing elements are so disposed that their transmission axes are perpendicular to each other, as so-called perpendicular polarizing elements. The perpendicular polarizing elements could correctly function as they are, for the incident light going through them in the normal direction to their surfaces, but could not function as perpendicular polarizing elements for the incident light going through them in the oblique direction relative to the normal direction, since crossing angle of the transmission axes shifts from a right angle. This causes light leakage in an oblique direction in a transmissive-type liquid-crystal display device, and is one of the factors worsening the viewing angle characteristics such as decreased contrast and color shift generating depending on the viewing angle.

In general, a polarizing element formed of a polyvinyl alcohol film or the like is not used in a liquid-crystal display device as a single member by itself, but, it is used in a liquid-crystal display device as a polarizing plate that is produced by sticking a protective film to both surfaces of the polarizing element to protect it. Some methods have been tried for broadening the viewing angle range for the device, by imparting predetermined optical characteristics to the protective film. Examples of a wide viewing angle polarizing plate are disclosed in Japanese Laid-open Patent Application No. 2001-350022. The publication discloses a wide viewing angle polarizing plate comprises a polarizing plate, with a biaxial optical retardation plate superposed thereon, which is an optical retardation plate has in-plate phase difference of 250-300 nm retardation in plane and 0.1-0.4 Nz; and a wide viewing angle polarizing plate comprises a polarizing plate, with a biaxial optical retardation plate superposed thereon, which is an optical retardation plate having in-plane phase difference of 250-300 nm retardation in plane and 0.6-1.1 NZ. According to the Example section of the publication, a transmissive-LCD was improved in terms of the viewing angle by employing these two wide viewing angle polarizing plates disposed at either of the sides of the cell respectively whose transmission axes are perpendicular to each other.

According to the viewing angle-broadening technology for polarizing plates described in the publication, the incident light must be made to run twice through a biaxial retardation plate having a predetermined birefringence. Accordingly, there should be some design limitation of a liquid-crystal display device, or there should require a complicated process of laminating two retardation plates having predetermined optical characteristics while the positional relation of their optical axes are accurately controlled, and therefore the technology is unfavorable in terms of producibility.

On the other hand, there has been tried to compensate the viewing angle dependency of a polarizing element by making the incident light thereto pass through only one retardation plate. However, this causes a problem of wavelength dependency. This may be because the retardation of a protective film of a polarizing element, which is generally selected from triacetyl acetate films, shows wavelength dependency. Even though the optical characteristics of a protective film are so controlled that the incident light at a wavelength of 550 nm (G), which is the center of a visible light wavelength range of from 400 to 700 nm, may be converted into an extinction point by passing through the protective film, the other incident light at 450 nm (B) and at 650 nm (R) may be converted into a polarized state shifted from the extinction point, and, as a result, the problem of color shift and decreased contrast generating depending on the viewing angle could not be still solved.

SUMMARY OF THE INVENTION

One object of the invention is to provide a novel polarizing plate capable of functioning as a wide viewing angle polarizing plate for a whole visible wavelength range.

Another object of the invention is to provide a novel transparent film, which may be used as a protective film for such a polarizing plate or as an optically-compensatory film in a liquid-crystal display device, capable of contributing to reducing both the wavelength dependency and the viewing angle dependency of the polarizing plate and the device.

Still another object is to provide a liquid-crystal display device having good viewing angle characteristics, improved in terms of contrast and color shift depending on the viewing angle.

In one aspect, the present invention provides a transparent film comprising a domain in which the Nz value in the normal direction of the film surface shows monotonous increase from 0 to 1 or monotonous decrease from 1 to 0, and having an in-plane retardation Re at a wavelength of 550 nm falling within the range from 510 to 610 nm, provided that Nz is defined as Nz=0.5+Rth(550)/Re(550), where Rth(550) and Re(550) respectively indicate a thickness-direction retardation and an in-plane retardation at a wavelength of 550 nm.

As embodiment of the invention, there are provided the transparent film comprising cellulose acylate as a major ingredient thereof; the transparent film comprising alicyclic structure-containing polymer as a major ingredient thereof; the transparent film, comprising two or more layers whose Nz values are different from each other; and the transparent film comprising a polymer film and two optically-anisotropic layers formed of a same or different liquid-crystal composition, one of them disposed on a surface of the polymer film and another of them disposed on another surface of the polymer film.

In another aspect, the invention provides a transparent film showing in-plane optical anisotropy, wherein its circular retardance (CRE1) as measured for the incident light in the normal direction of the film surface is nearly equal to 0 (zero); and the absolute values of its circular retardance (CRE2), as measured for the incident light going into the film at a polar angle of 60 degrees relative to the normal direction of the film surface in four directions at an azimuth angle of 45 degrees, 135 degrees, 225 degrees and 315 degrees, provided that the in-plane slow axis is at an azimuth angle of 0 degree, are not 0 (zero) and nearly equal to each other.

Preferably, the absolute values of CRE2 fall within the range from 32 to 38 nm.

In another aspect; the invention provides a polarizing plate comprising a polarizing film (polarizing element) and the transparent film of the invention; a liquid-crystal display device comprising a liquid-crystal cell, a polarizing film and the transparent film of the invention.

In the liquid-crystal display device of the invention, the transparent film may be disposed between a liquid-crystal cell and a polarizing film.

Figure 1:
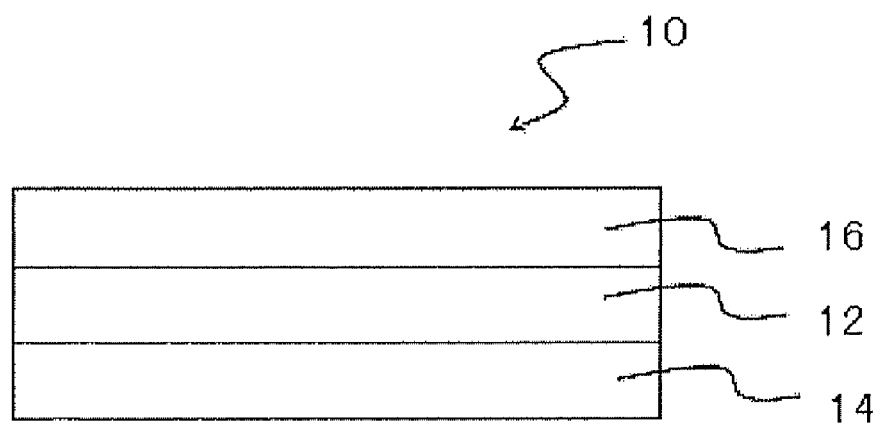
FIG. 1 is a schematic cross-sectional view of one example of a polarizing plate of the invention.

In the drawings, the reference numerals have the following meanings:

10 Polarizing Plate
12 Polarizing Element (Polarizing Film)
14 Protective Film
16 Transparent Film of the Invention

DETAILED DESCRIPTION OF THE INVENTION

The invention is described hereinunder. In this description, the numerical range expressed by the wording "a number to another number" means the range that falls between the former number indicating the lowermost limit of the range and the latter number indicating the uppermost limit thereof. In the description, regarding angles, the allowable error is about ±10°.

In this description, $Re(\lambda)$ and $Rth(\lambda)$ are an in-plane retardation (nm) and a thickness-direction retardation (nm), respectively, at a wavelength of $\lambda$. $Re(\lambda)$ is measured by applying light having a wavelength of $\lambda$ nm to a film in the normal direction of the film, using KOBRA 21ADH or WR (by Oji Scientific Instruments).

When a film to be analyze by a monoaxial or biaxial index ellipsoid, $Rth(\lambda)$ of the film is calculated as follows. $Rth(\lambda)$ is calculated by KOBRA 21ADH or WR based on six $Re(\lambda)$ values which are measured for incoming light of a wavelength $\lambda$ nm in six directions which are decided by a 10° step rotation from 0° to 50° with respect to the normal direction of a sample film using an in-plane slow axis, which is decided by KOBRA 21ADH, as an a tilt axis (a rotation axis; defined in an arbitrary in-plane direction if the film has no slow axis in plane); a value of hypothetical mean refractive index; and a value entered as a thickness value of the film.

In the above, when the film to be analyzed has a direction in which the retardation value is zero at a certain tilt angle, around the in-plane slow axis from the normal direction as the rotation axis, then the retardation value at the tilt angle larger than the tilt angle to give a zero retardation is changed to negative data, and then the $Rth(\lambda)$ of the film is calculated by KOBRA 21ADH or WR.

Around the slow axis as the tilt angle (rotation angle) of the film (when the film does not have a slow axis, then its rotation axis may be in any in-plane direction of the film), the retardation values are measured in any desired inclined two directions, and based on the data, and the estimated value of the mean refractive index and the inputted film thickness value, Rth may be calculated according to the following formulae (21) and (22):

$$Re(\theta) = \left[nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}}\right] \times \frac{d}{\cos\left\{\sin^{-1}\left(\frac{\sin(-\theta)}{nx}\right)\right\}} \quad (21)$$

$$Rth = \{(nx+ny)/2 - nz\} \times d \quad (22)$$

wherein $Re(\theta)$ represents a retardation value in the direction inclined by an angle $\theta$ from the normal direction; nx represents a refractive index in the in-plane slow axis direction; ny represents a refractive index in the in-plane direction perpendicular to nx; and nz represents a refractive index in the direction perpendicular to nx and ny. And "d" is a thickness of the sample.

When the film to be analyzed is not expressed by a monoaxial or biaxial index ellipsoid, or that is, when the film does not have an optical axis, then $Rth(\lambda)$ of the film may be calculated as follows:

$Re(\lambda)$ of the film is measured around the slow axis (judged by KOBRA 21ADH or WR) as the in-plane tilt axis (rotation axis), relative to the normal direction of the film from −50 degrees up to +50 degrees at intervals of 10 degrees, in 11 points in all with a light having a wavelength of $\lambda$ nm applied in the inclined direction; and based on the thus-measured retardation values, the estimated value of the mean refractive index and the inputted film thickness value, $Rth(\lambda)$ of the film may be calculated by KOBRA 21ADH or WR. Based on thus-calculated nx, ny and nz, $Nz=(nx-nz)/(nx-ny)$ is further calculated.

In the above-described measurement, the hypothetical value of mean refractive index is available from values listed in catalogues of various optical films in Polymer Handbook (John Wiley & Sons, Inc.). Those having the mean refractive indices unknown can be measured using an Abbe refract meter. Mean refractive indices of some major optical films are listed below:

cellulose acylate (1.48), cycloolefin polymer (1.52), polycarbonate (1.59), polymethylmethacrylate (1.49) and polystyrene (1.59).

KOBRA 21ADH or WR calculates nx, ny and nz, upon enter of the hypothetical values of these mean refractive indices and the film thickness. Base on thus-calculated nx, ny and nz, $Nz=(nx-nz)/(nx-ny)$ is further calculated.

In this description, the numerical value and the numerical range indicating the optical characteristics are to be interpreted as the numerical value and the numerical range that include generally-allowable errors for the liquid-crystal display device and its constitutive members.

The invention relates to a transparent film comprising a domain in which the Nz value in the normal direction of the film surface shows monotonous increase from 0 to 1 or monotonous decrease from 1 to 0, and having an in-plane retardation Re at a wavelength of 550 nm falling within the range from 510 to 610 nm. Combined with a polarizing element, the transparent film of the invention may be employed in a liquid-crystal display device, and disposed between a liquid-crystal cell and the polarizing element, thereby contributing to solving the problems of contrast reduction and color shift in the oblique direction of the device. Whether a film "comprises a domain in which the Nz value in the normal direction of the film surface shows monotonous increase from 0 to 1 or monotonous decrease from 1 to 0" may be confirmed according to the method described in a reference, Y. Takahashi, H. Watanabe and T. Kato, "Depth-Dependent Determination of Molecular Orientation for WV-Film", IDW'04 (2004) p. 651. Concretely, this means as follows: The x, y and z components at five P2 points taken at constant intervals in the thickness direction of a film are measured, and the data nx, ny and ny are calculated based on the measured data. Using the calculated data, the value Nz is calculated. If the calculated Nz varies from 0 to 1 or from 1 to 0, for example, the Nz value of each of those 5 points varies by about 0, 0.25, 0.5, 0.75, 1, it can be said that the film comprising a domain in which the Nz value in the normal direction of the film surface shows monotonous increase from 0 to 1 or monotonous decrease from 1 to 0. Regarding the term "monotonous increase or monotonous decrease" in Nz of a film, the increase or decrease ratio may not be limited; or the domain may contain a domain with neither increase nor decrease, but the domain in which the Nz value in the normal direction shows monotonous increase does not contain any domains with decrease in Nz, and the domain in which the Nz value in the normal direction shows monotonous decrease does not contain any domains with increase in Nz. Preferred is monotonous increase with a constant increase ratio, or a monotonous decrease with a constant decrease ratio.

One embodiment of the transparent film of the invention relates to a transparent film having a two- or more multi-layered structure in which the constitutive layers have a different Nz value. More concretely, a transparent film that comprises a polymer film and at least one optically-anisotropic layer of the same or different liquid-crystal composition formed on both surface of the polymer film, in which Nz of one optically-anisotropic layer is 0, Nz of the polymer film is 0.5, and Nz of the other optically-anisotropic layer is 1.0, is one embodiment of the invention. When plural optically-anisotropic layers having different Nz are formed on one surface of the polymer film and/or when the supporting polymer film is a multi-layered polymer film composed of plural polymer films each having different Nz, then a transparent film may be produced of which Nz shows monotonous increase (or monotonous decrease) at a minimal change ratio within a range of from 0 to 1.

One example of a polarizing plate comprising a transparent film of the invention is shown in FIG. 1. The polarizing plate 10 in FIG. 1 has a polarizing element (polarizing film) 12 of a polyvinyl alcohol (PVA) film colored with iodine or the like, and protective films 14 and 16 of cellulose acylate films or the like formed on its surface. The protective film 16 is a transparent film of the invention, and this satisfies the above-mentioned predetermined optical characteristics. When the polarizing plate 10 is built in a liquid-crystal display device, then it may be combined with any other polarizing plate so that a liquid-crystal cell are disposed between them, that the protective film 16, the transparent film of the invention, faces the side of the liquid-crystal cell, and that their absorption axes are perpendicular to each other.

It is not always necessary that the transparent film of the invention is directly stuck to the surface of a polarizing element as a protective film for the polarizing element. For example, the transparent film of the invention may be disposed between a polarizing element and a liquid-crystal cell, serving as an optically-compensatory film. In case where a protective film for a polarizing element is disposed between a polarizing element and the transparent film of the invention, then the protective film is preferably an optically isotropic film having no retardation.

Figure 2:
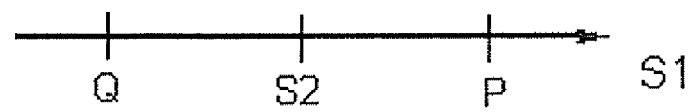
FIG. 2 is a schematic view showing a linear polarization state point P and its extinction point Q on a Poincare sphere.
Figure 3:
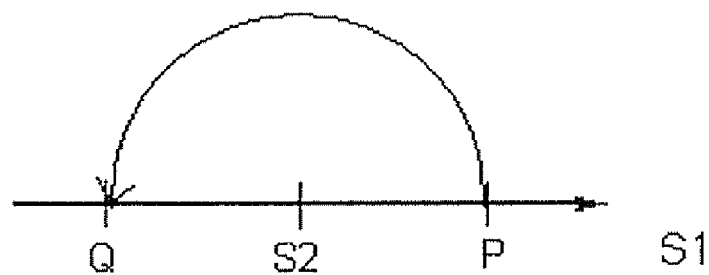
FIG. 3 is a schematic view showing the trace in a conventional conversion example from a linear polarization state point P to its extinction point Q on a Poincare sphere.

Next described are the effects of the transparent film and the polarizing film of the invention with reference to the drawings. FIG. 2 to FIG. 5 are views of a Poincare sphere seen in the positive direction of the S2 axis thereof. The Poincare sphere is a three-dimensional map that describes a polarization state, in which the route on the equator of the sphere indicates the polarization state of a linear polarized light having an ellipticity of 0. In FIG. 2, the incident light in the oblique direction passes through a polarizing element to be a linear polarized light, and the point P indicates the polarization state of the linear polarized light. When the polarization state point P is converted into the extinction point on the S1 axis, or that is, the polarization state point Q, then the viewing angle dependency of the perpendicular polarizing element could be solved. Accordingly, the birefringence of the protective film shall be so controlled that the polarization state of the light having passed through the protective film disposed between the liquid-crystal cell and the polarizing element could be converted from the point P to the point Q. On the Poincare sphere, the polarization state change owing to light passing through a retardation region may be indicated by the rotation by a specific angle around the specific axis determined in accordance with the optical characteristics. One example of conversion from the polarization state point P to the polarization state point Q is a conversion case where a ½ wavelength plate is used as a protective film and it is rotated by π around the S2 axis as the rotation axis, as in FIG. 3. The rotation angle is proportional to the retardation in the retardation region through which the light has passed, and is proportional to the reciprocal number of the wavelength of the incident light.

Many films used as protective films, such as cellulose acylate films are such that their refractive index (n) is not constant for any visible wavelengths of the incident light thereto, and, in general, it tends to be smaller for the light having a longer visible wavelength, and as a result, the same shall apply to their retardation; or that is, they have wavelength dependency in that their retardation tends to be smaller for the incident light having a longer visible wavelength. In addition to the influence of the wavelength dependency in terms of the film refractivity, since the rotation angle is proportional to the reciprocal number of λ, as so mentioned hereinabove, the polarization state transition on the Poincare sphere is such that the rotation angle is smaller for the light having a longer wavelength. Accordingly, when one retardation plate is used, it is difficult to attain the polarization state conversion shown in FIG. 3, for all the light R (650 nm), the light G (550 nm) and the light B (450 nm); and for example, even though a protective film that enables the conversion into the extinction point for the light G (550 nm) having the center wavelength, the light R and the light B still undergo shifting from the extinction point, as shown in FIG. 4.

Figure 4:
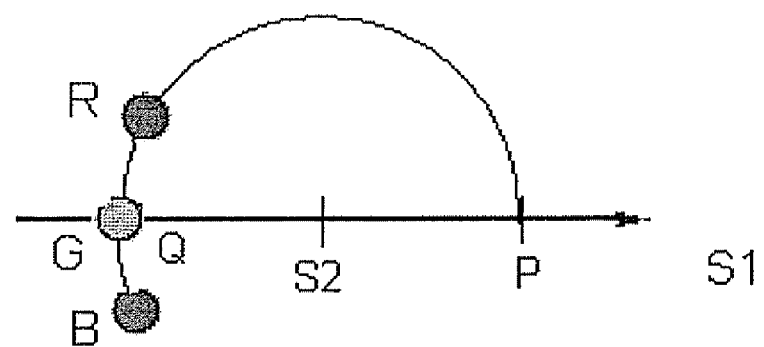
FIG. 4 is a schematic view showing the trace of light R, light G and light B in a conventional conversion example from a linear polarization state point P to its extinction point Q on a Poincare sphere.

According to the invention, the above-mentioned wavelength dependency is reduced by changing the polarization state using not only the birefringence but also the optical rotation power of the film, other than using the birefringence of the film alone as shown in FIG. 4. The transparent film of the invention comprises a domain in which the Nz value in the normal direction of the film surface shows monotonous increase or monotonous decrease within a range of from 0 to 1. That domain may be approximated, for example, to a virtual laminate where an infinite number of film layers having an extra-small thickness are laminated and where Nz increases or decreases extremely slightly between the adjacent constitutive layers. When Nz=1 at the outermost layer on the light-input side and when Nz=0 at the outermost layer on the light-output side, the polarization state conversion of the incident light into the virtual laminate is analyzed as follows. First, in the first layer $L_{Nz=0}$, the linear polarized light is influenced by the birefringence of the layer, and the conversion trace may be represented as the rotation around the rotation axis that is parallel to the S2 axis at the point P. In the second layer, Nz decreases slightly, and therefore the rotation axis is to be parallel to the S2 axis at the point slightly shifted in the direction of S1=0 from the point P on the S1 axis. In the third, fourth . . . layers in that order, Nz further decreases and the rotation axis moves toward S1=0; and in the layer $L_{Nz=0.5}$ having Nz=0.5, the rotation axis shall be the S2 axis. Finally, in the outermost layer $L_{Nz=1}$ on the light-output side, the rotation axis shall be parallel to the S2 axis at the extinction point Q.

Figure 5:
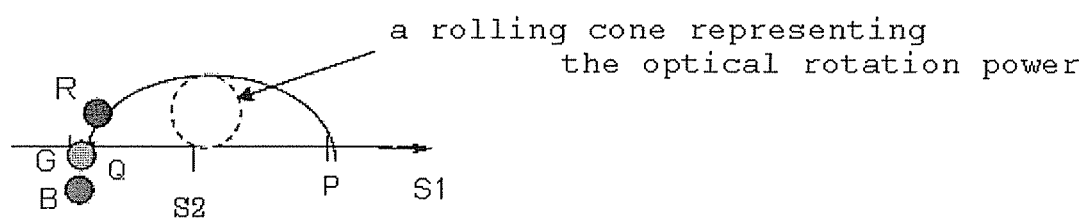
FIG. 5 is a schematic view showing the trace of light R, light G and light B in a conversion example from a linear polarization state point P to its extinction point Q on a Poincare sphere, using a transparent film of the invention.

The polarization state conversion trace during this is approximated as ΔNz→0, in which ΔNz indicates the Nz change between the adjacent layers, and this may be expressed as in FIG. 5 and the polarization state conversion trace shown in FIG. 5 is explained as follows. In FIG. 5, the dotted line means a rolling cone that indicates an optical rotation power. In this, the polarization state conversion trace is the same as the trace of the rolling cone that spin around 360 degrees while its center shifts on the S1 axis from the point P, in the direction going to the direction of S1=0, further toward the negative direction, to the extinction point Q. The wavelength dependency of refractivity may have some influence on the rotation of the rolling cone that indicates an optical rotation power; however, as compare with the rotation that utilizes only the birefringence as shown in FIG. 4, the separation of the light R, the light G and the light B at the time when the polarization state has reached the extinction point Q may be small, and therefore the wavelength dependency may be reduced. The Re (sum total of in-plane retardation) value of the transparent film is necessary for rotating the rolling cone by 360° as the movement on the Poincare sphere, and it must be 560 nm or so. In fact, when Re is within a range of from 510 to 610 nm, this is more effective as compared with conventional techniques.

In another aspect, the transparent film of the invention can be expressed as a film that may not produce an optical rotation power for the incident light in the normal direction of the film, but may produce an optical rotation power for the incident light in the oblique direction to the film. More specifically, the transparent film of the invention may be expressed as a transparent film showing in-plane optical anisotropy, wherein its circular retardance (CRE1) as measured for the incident light in the normal direction of the film surface is nearly equal to 0 (zero); and the absolute values of its circular retardance (CRE2), as measured for the incident light going into the film in different plural oblique directions of the film surface are not 0 (zero) and nearly equal to each other. The different plural oblique directions relative to the film surface may be defined, for example, as four directions, at a polar angle from the normal direction of the film surface of 60 degrees, and at an azimuth angle of 45 degrees, 135 degrees, 225 degrees and 315 degrees, provided that the in-plane slow axis of the film is at an azimuth angle of 0 degree. According to the film of the invention, the absolute values of CRE2 of the film to the incident light in these four directions are nearly equal to each other, and this can not be satisfied by a film in which the slow axis direction is simply twisted, and it can be said that the transparent film of the invention differs from such a film. The transparent film of the invention has Nz distribution in the thickness direction thereof, and as a result, provided that the in-plane slow axis of the film is at an azimuth angle of 0 degree, the absolute values of CRE2 in four directions at a different azimuth angle of 45 degrees, 135 degrees, 225 degrees and 315 degrees are nearly equal to each other though its positivity or negativity may differ. The absolute values of CRE2 to the incident light in the above-mentioned four directions preferably fall with in the range from 32 to 38 nm. The wording "nearly equal to" means that the values are the completely same or the difference between the values is at most 5 nm.

The film CRE (CRE1 and CRE2) may be measured, for example, using Axometrics' Mueller matrix polarimeter "AxoScan". The details of CRE are described in a reference, S. Y. Lu and R. A. Chipman, J. Opt Soc. Am. A. 13 (1996) 1106.

The starting material for the transparent film of the invention is not specifically defined. For example, it may be a stretched birefringent polymer film, or an optically-anisotropic layer formed by curing a liquid-crystalline composition in a specific alignment state. The transparent film is not limited to a single-layered film, but may have a multi-layered structure formed by laminating plural layers. In the multi-layered embodiment, the constitutive layers may be formed of the same or different materials. For example, it may be a laminate of a polymer film and an optically-anisotropic layer formed of a liquid-crystalline composition. For the multi-layered embodiment, a multi-layered laminate that comprises a layer formed by a coating process is preferred to a laminate of stretched polymer films, in terms of the thickness thereof.

The starting material to be used, its amount and the production condition are selected, and the parameters are controlled to fall within a desired range, whereby a transparent film of which the Nz value satisfies the above-mentioned condition may be produced. Specifically, the film may be produced as follows:

at least two different types of polymers showing different wavelength dispersion characteristics of the retardation (for example, plural types of polymers whose absorption wavelengths in the main chain direction are different from each other) may be mixed and the mixture may be used as a starting material;

an additive having absorption at a wavelength falling within a UV range or an IR range may be added to a starting material so as to control the wavelength dispersion for visible light of the mixture;

an additive having an absorption at a wavelength falling within a UV range or an IR range and capable of structurally aligning in the thickness direction, the stretch direction or the non-stretch direction of film may be added to a starting material;

a lamination of polymer layers (for example, polymer layers whose birefringence is different from each other) may be carried out by applying a polymer composition to a surface of a lower polymer layer or sticking a polymer film on a lower polymer layer; or during the process of film formation, a temperature profile that is uneven in the thickness direction of the film or a UV intensity distribution may be applied to a film, to thereby control the uniformity in alignment or composition.

The material to be used for producing the transparent film of the invention is not specifically defined. Preferably, cellulose acylate and alicyclic structure-containing polymer resin (norbornene-type polymer) are used as the major ingredient of the film.

The invention also relates to a polarizing plate comprising the transparent film of the invention. The polarizing plate of the invention preferably comprises the transparent film of the invention as one protective film for the polarizing element therein, or that is, having the transparent film of the invention as directly stuck to the surface of the polarizing element to be in contact with it. In case where the polarizing plate of the invention is built in a liquid-crystal display device, it is desirable that the transparent film of the invention is disposed on the side of the liquid-crystal cell therein.

The characteristics of the polarizing plate may be described as the diattenuation vector D and the polarizance vector P thereof.

The diattenuation vector D indicates a polarization state in which the quantity of light transmittance is the maximum on a Poincare sphere; and the polarizance vector P indicates a polarization state of existing light on a Poincare sphere when unpolarized light is incident. The vectors are expressed as follows: Diattenuation vector D=(Dh, D45, Dr); polarizance vector P=(Ph, p45, Pr). When a dual rotate retarder-type polarimeter is used as a device, it is desirable since both D and P of a laminate of a polarizing film and a birefringent polymer film may be measured. The dual rotate retarder-type polarimeter is provided with, as detection heads, a polarized light generator capable of generating a polarized light and a polarized light analyzer capable of detecting a polarized light, in which the two heads each comprise a polarizing element and a rotating wavelength plate rotating at high speed. As a commercial product, Axometrics' Mueller matrix polarimeter is available, and this may be used in the invention.

The diattenuation vector and the polarizance vector may also be described as a normalized diattenuation vector D'= (Dh', D45', Dr') and a normalized polarizance vector P'=(Ph', P45', Pr') in which the vector size is normalized to 1 as a unit vector. Their details are described in Y. Ootani: O plus E 29 p. 20 (2007), and S-Y. Lu and R. A. Chipman: J. Opt. Soc. Am. A 13 p. 1106 (1996).

In case where the characteristics of the polarizing plate of the invention are described by way of P' thereof, the absolute value of P45' of the polarizing plate, |P45'| is at least 0.9, preferably at least 0.99 or so, or that is, the polarizing plate is a wide viewing angle polarizing plate.

The transparent film or the polarizing plate of the invention may be used liquid-crystal display devices employing any mode. For example, they may be used in liquid-crystal display device employing any mode such as IPS mode, VA mode, TN mode or OCB mode.

EXAMPLES

Some examples of the transparent film of the invention are actually demonstrated for their effects, and the results are shown in following Table 1.

TABLE 1

| | Nz | In-plane Retardation (nm) | CRE1 (nm) | Absolute Value of CRE2 (nm) at azimuth angle of 45 degrees | Absolute Value of CRE2 (nm) at azimuth angle of 135 degrees | Absolute Value of CRE2 (nm) at azimuth angle of 225 degrees | Absolute Value of CRE2 (nm) at azimuth angle of 315 degrees | Transmittance of display in the black state (%) |
|---|---|---|---|---|---|---|---|---|
| Comparative Example | 0.5 (constant in the thickness direction) | 275 | 0 | 0 | 0 | 0 | 0 | 0.034 |
| Example 1 | change from 0 to 1 in the thickness direction | 510 | 0 | 38 | 38 | 38 | 38 | 0.031 |
| Example 2 | change from 0 to 1 in the thickness direction | 550 | 0 | 35 | 35 | 35 | 35 | 0.021 |
| Example 3 | change from 0 to 1 in the thickness direction | 560 | 0 | 35 | 35 | 35 | 35 | 0.021 |
| Example 4 | change from 0 to 1 in the thickness direction | 570 | 0 | 35 | 35 | 35 | 35 | 0.021 |
| Example 5 | change from 0 to 1 in the thickness direction | 600 | 0 | 35 | 35 | 35 | 35 | 0.026 |
| Example 6 | change from 0 to 1 in the thickness direction | 610 | 0 | 32 | 32 | 32 | 32 | 0.028 |

Comparative Example is a film of which the Nz value is constantly 0.5 in the thickness direction thereof, and this is shown for comparison with the invention. Examples 1 to 6 are films of the invention, of which the Nz value changes from 0 to 1 in the thickness direction thereof and of which the in-plane retardation Re falls within the range from 510 to 610 nm. From the data in the Table, it is understandable that the films of Examples 1 to 6 all have CRE1 of 0, and that their absolute values of CRE2, as measured for the incident light in four oblique directions, are not 0 but are equal to each other.

It is also understandable that the films of Examples 1 to 6 have a lower transmittance (%) in the black state and therefore have an improved contrast, as compared with the film of Comparative Example.

Regarding to a lamination of a polarizing element (polarizing film) and each of the transparent films, Example Nos. 1-6, in which the film is disposed at the exiting side relative to the polarizing element (polarizing film), the normalized polarizance vector P'=(Ph', P45', Pr') is shown in following Table 2. The data of the normalized polarizance vector P' are for light which is incident at a polar angle of 60 degrees in the normal direction of the film and at an azimuth angle of 45 degrees, provided that the in-plane slow axis is at an azimuth angle of 0 degree.

TABLE 2

| | Nz | |Ph'| | |P45'| | |Pr'| | Transmittance in the black state (%) |
|---|---|---|---|---|---|
| Comparative Example | 0.5 (constant in the thickness direction) | 0.108 | 0.994 | 0.000 | 0.034 |
| Example 1 | change from 0 to 1 in the thickness direction | 0.138 | 0.990 | 0.006 | 0.031 |
| Example 2 | change from 0 to 1 in the thickness direction | 0.107 | 0.994 | 0.000 | 0.021 |
| Example 3 | change from 0 to 1 in the thickness direction | 0.099 | 0.995 | 0.001 | 0.021 |
| Example 4 | change from 0 to 1 in the thickness direction | 0.093 | 0.996 | 0.002 | 0.021 |
| Example 5 | change from 0 to 1 in the thickness direction | 0.075 | 0.997 | 0.010 | 0.026 |
| Example 6 | change from 0 to 1 in the thickness direction | 0.070 | 0.997 | 0.014 | 0.028 |

Since P' is a unit vector, the maximum value of the vector size is 1. Taking this into consideration, it is understandable from the following Table that the absolute values |P45'| of P45' of the polarizing plates of Examples 1 to 6 fall within the range from 0.99 to less than 1.

In the following Examples, transparent films and polarizing plates were actually produced according to the manner mentioned below, and their effects were confirmed in IPS-mode liquid-crystal display devices. However, the invention should not be limited to these Examples.

Comparative Example 1

<Production of Film No. 1>

A polyester film showing a dimensional changeability (MD/TD) of 1.15 at 165° C. was stuck to both surfaces of a polycarbonate film having a length of 100 m, a width of 180 mm, a thickness of 110 μm and Re of 0 nm, using an acrylic adhesive layer therebetween. Using a roll presser, this was processed at a roll speed ratio of 0.97 and at a roll temperature of 165° C. under a room temperature atmosphere to thereby shrink the polycarbonate, and then the polyester film was peeled off. The film was stretched by 1.1 times in the cross direction in an atmosphere at 163° C. to obtain Film No. 1.

Using an automatic birefringence meter (KOBRA-21ADH, by Oji Scientific Instruments), the light incident angle dependency of Re of Film No. 1 was measured, and the optical characteristics thereof were calculated. As a result, Re was 275 nm and Nz was 0.5; and it was confirmed that the slow axis is perpendicular to the machine direction (ND) of the film. Using Axometrics' AxoScan, Film No. 1 was analyzed for its in-plane CR1 at a wavelength of 550 nm and for its CR2 at a polar angle of 60 degrees and an azimuth angle of 45 degrees, 135 degrees, 225 degrees and 315 degrees. As a result, CR1 and CR2 at every azimuth angle were 0 nm. Then, Film No. 1 was used as a comparative film.

<Production of Comparative Polarizing plate No. 1>

A rolled polyvinyl alcohol film having a thickness of 80 μm was continuously unrolled and stretched by 5 times in an aqueous iodine solution and then dried to prepare a polarizing film. The polyvinyl alcohol was Kuraray's PVA-117H. The comparative film, Film No. 1, was stuck to one surface of the polarizing film, and to the other surface thereof, a FUJIFILM's triacetyl cellulose film, TD80U, was laminated and stuck as a protective film, thereby producing a polarizing plate, Comparative Polarizing Plate No. 1.

The normalized polarizance of Comparative Polarizing Plate No. 1 was measured with AxoScan. At a polar angle of 60 degrees in the normal direction of the film surface, and in the direction at an azimuth angle of 45 degrees provided that the in-plane slow axis was at an azimuth angle of 0 degree, light was inputted into Comparative Polarizing Plate No. 1, in which the comparative film, Film No. 1, was on the output side of the polarizing film. The absolute value of the component P45' of the normalized polarizance vector P' of Comparative Polarizing Plate No. 1 was 0.994.

Example 1

<Production of Transparent Film No. 10>

On one surface of Film No. 1 produced in Comparative Example 1, formed was an optically-anisotropic layer 1, and on the other surface thereof, formed was an optically-anisotropic layer 2 according to the method mentioned below, thereby constructing a transparent film, Film No. 10, of Example of the invention.

<Formation of Optically-Anisotropic Layer 1 of Rod-Shaped Liquid-Crystal Composition>

(Formation of Alignment Layer)

A coating liquid for an alignment layer having the formulation mentioned below was prepared.

| | |
|---|---|
| Polymer compound P mentioned below | 4 mas. pts. |
| Triethylamine | 2 mas. pts. |
| Aqueous 5% Solution of Deconal EX-521 (Nagase Chemical Industry's epoxy compound) | 8.1 mas. pts. |
| Water | 57 mas. pts. |
| Methanol | 29 mas. pts. |

Polymer Compound P

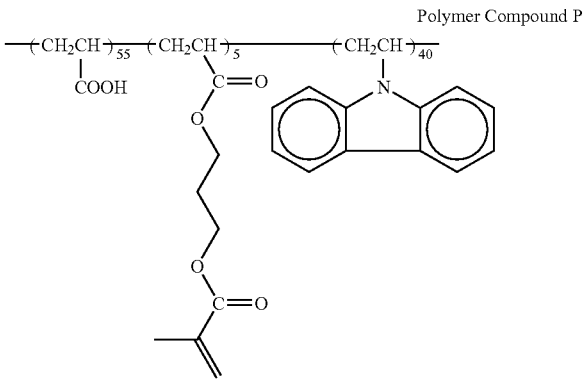

The coating liquid for alignment film was applied to one surface of Film No. 1, and dried at 25° C. for 30 seconds and then with hot air at 120° C. for 120 seconds. After dried, the thickness of the alignment layer was 1.5 μm. Next, the formed layer was rubbed in the same direction as the machine direction of Film No. 1.

(Formation of Optically-Anisotropic Layer 1)

A coating liquid for optically-anisotropic layer having the formulation mentioned below was prepared.

| | |
|---|---|
| Rod-shaped Liquid-crystalline Compound mentioned below (Compound IV-2) | 38.1 mas. % |
| Sensitizer A mentioned below | 0.38 mas. % |
| Photopolymerization Initiator B mentioned below | 1.14 mas. % |
| Alignment Controlling Agent C mentioned below | 0.19 mas. % |
| Glutaraldehyde | 0.04 mas. % |
| Methyl Ethyl Ketone | 60.15 mas. % |

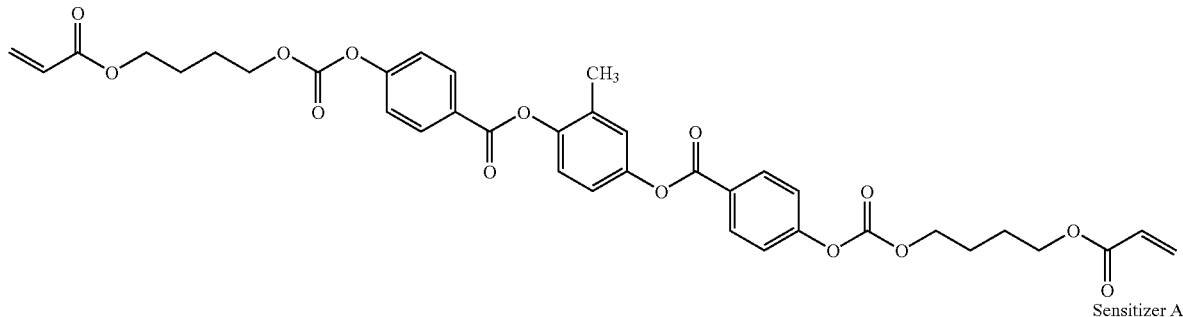

IV-2

Sensitizer A

Photopolymerization Initiator B

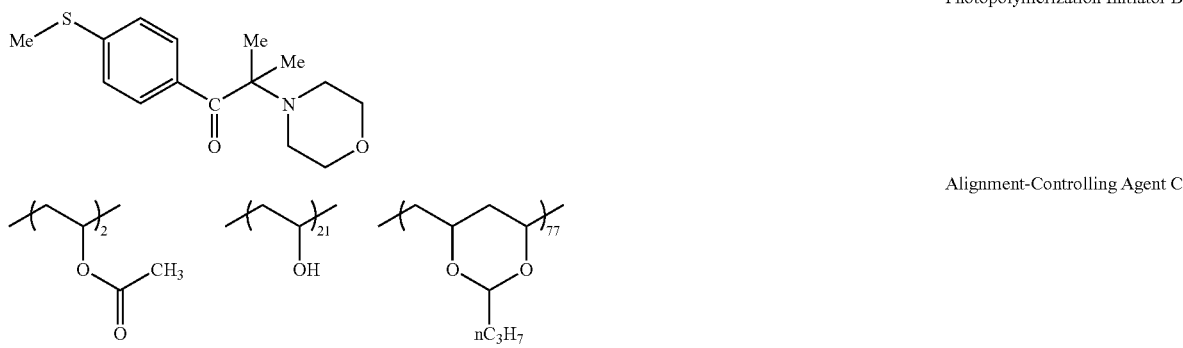

Alignment-Controlling Agent C

The thus-prepared coating liquid for optically-anisotropic layer was continuously applied to the rubbed surface of the alignment film formed in the above, using a bar coater, and dried and heated (for alignment ripening), and irradiated with UV ray to fix the rod-shaped liquid-crystalline molecules as horizontally aligned, thereby forming an optically-anisotropic layer 1 (thickness, 1.1 μm) thereon.

Thus formed, the optically-anisotropic layer 1 was transferred onto a glass substrate, and its birefringence characteristics were measured. The Nz value was 1, and the Re value was 143 nm. The slow axis was in the direction perpendicular to the machine direction (rubbing direction) of the film.

<Formation of Optically-Anisotropic Layer 2 of Discotic Liquid-Crystalline Composition>

(Formation of Alignment Film)

A coating liquid for alignment film having the formulation mentioned below was applied to another surface, which was the surface having no optically anisotropic layer 1 thereon, of Film No. 1, using a wire bar coater, to form a layer of 20 ml/m². This was dried with hot air at 60° C. for 60 seconds and then with hot air at 100° C. for 120 seconds, thereby forming a polymer layer. Next, the thus-formed polymer layer was rubbed in the direction parallel to the slow axis direction of Film No. 1, thereby forming an alignment layer.

Composition of Coating Liquid for Alignment Layer:

| | |
|---|---|
| Modified Polyvinyl Alcohol mentioned below | 10 mas. pts. |
| Water | 371 mas. pts. |
| Methanol | 119 mas. pts. |
| Glutaraldehyde | 0.5 mas. pts. |
| Tetramethylammonium Fluoride | 0.3 mas. pts. |

Modified Polyvinyl Alcohol

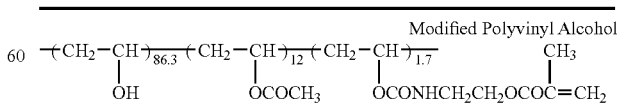

(Formation of Optically-Anisotropic Layer 2)

Next, a solution prepared by dissolving 1.8 g of a discotic liquid-crystalline compound mentioned below, 0.2 g of ethyleneoxide-modified trimethylolpropane triacrylate (V#360, by Osaka Organic Chemistry), 0.06 g of a photopolymerization initiator (Irgacure 907, by Ciba-Geigy), 0.02 g of a sensitizer (Kayacure DETX, by Nippon Kayaku), and 0.01 g of an air interface vertical alignment agent (P-6) in 3.9 g of methyl ethyl ketone, was applied to the rubbed surface of the alignment layer, using a #4 wire bar. This was stuck to a metal frame, and heated in a thermostat at 125° C. for 3 minutes to thereby align the discotic liquid-crystal compound. Next, using a 120 W/cm high-pressure mercury lamp at 100° C., this was subjected to UV irradiation for 30 seconds to crosslink the discotic liquid-crystalline compound. Next, this was left cooled to room temperature. In that manner, an optically-anisotropic layer 2 was formed.

Discotic Liquid-Crystalline Compound

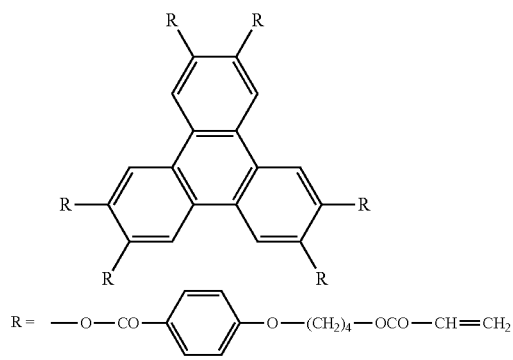

Air Interface Vertical Alignment Agent P-6

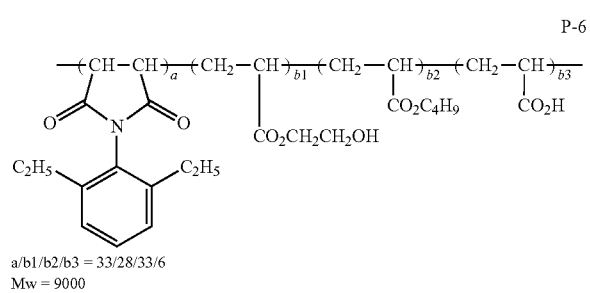

Thus formed, the optically-anisotropic layer 2 was transferred onto a glass substrate, and its birefringence characteristics were measured. The Nz value was 0, and the Re value was 142 nm. The slow axis was in the direction parallel to the rubbing direction of the alignment layer.

In the manner as above, the optically-anisotropic layer 1 was formed on one surface of Film No. 1 and the optically-anisotropic layer 2 was on the other surface thereof, thereby constructing a transparent film, Film No. 10. The in-plane retardation Re of Film No. 10 was measured at a wavelength of 550 nm, and it was 560 nm. In other words, Film No. 10 is a transparent film of Example of the invention, of which the Nz value shows monotonous increase from 0 to 1 in the thickness direction of the film (the optically-anisotropic layer 2 had Nz=0, and Film No. 1 had Nz=0.5, and the optically-anisotropic layer 1 had Nz=1), and the in-plane retardation Re at a wavelength of 550 nm was 560 nm.

The thus-constructed transparent film, Film No. 10, was analyzed for the in-plane CR1 thereof at a wavelength of 550 nm, using Axometrics' AxoScan, and it was found that CR1 was 0. Its CR2 values at an azimuth angle of 45 degrees, 135 degrees, 225 degrees and 315 degrees and at a polar angle of 60 degrees were measured. As a result, it was found that CR2 was 32 nm at an azimuth angle of 45 degrees and 225 degrees; and CR2 was −32 nm at an azimuth angle of 135 degrees and 315 degrees. Accordingly, the absolute values of CR2 of Film No. 10, at an azimuth angle of 45 degrees, 135 degrees, 225 degrees and 315 degrees were nearly equal to each other, 32 nm.

<Production of Polarizing Plate No. 10>

A rolled polyvinyl alcohol film having a thickness of 80 μm was continuously unrolled and stretched by 5 times in an aqueous iodine solution and then dried to prepare a polarizing film. The polyvinyl alcohol was Kuraray's PVA-117H. The transparent film, Film No. 10, was stuck to one surface of the polarizing film, and to the other surface thereof, a FUJIFILM's triacetyl cellulose film, TD80U, was laminated and stuck as a protective film, thereby constructing a polarizing plate, Polarizing Plate No. 10. Film No. 10 and the polarizing film were so disposed that the surface of the optically-anisotropic layer 1 of Film No. 10 was in contact with the polarizing film.

The normalized polarizance vector P' of the polarizing plate, Polarizing Plate No. 10, was measured with AxoScan. At a polar angle of 60 degrees in the normal direction of the film surface, and in the direction at an azimuth angle of 45 degrees provided that the in-plane slow axis was at an azimuth angle of 0 degree, light was inputted into Polarizing Plate No. 10, in which Film No. 10 was on the output side of the polarizing film. The absolute value of the component P45' of the normalized polarizance vector P' of Polarizing Plate No. 10 was 0.995.

Example 2

<Production of Polarizing Plate No. 11>

A polarizing plate, Polarizing Plate No. 11, of Example 2 was produced in the same manner as in Example 1, for which, however, Film No. 10 was laminated with the polarizing film so that the surface of the optically-anisotropic layer 2 of Film No. 10 was in contact with the polarizing film.

The normalized polarizance vector P' of the polarizing plate, Polarizing Plate No. 11, was measured with AxoScan. At a polar angle of 60 degrees in the normal direction of the film surface, and in the direction at an azimuth angle of 45 degrees provided that the in-plane slow axis was at an azimuth angle of 0 degree, light was inputted into Polarizing Plate No. 11, in which Film No. 10 was on the output side of the polarizing film. The absolute value of the component P45' of the normalized polarizance vector P' of the polarizing plate 11 was 0.995.

[Mounting on Liquid-Crystal Display Device and Evaluation]

Using Polarizing Plate Nos. 1, 10 and 11 produced in Comparative Example 1, Example 1 and Example 2, liquid-crystal display devices were produced.

Concretely, using each of Polarizing Plate Nos. 1, 10 and 11, and a conventional polarizing plate (FUJIFILM's Z-TAC was used as a protective layer for the polarizing plate), an IPS-mode liquid-crystal cell was sandwiched between them so that Film No. 1, or 11 was disposed at the side of the liquid-crystal cell, that the in-plane absorption axes of the two polarizing plates between which the liquid-crystal cell was sandwiched were perpendicular to each other, and that the in-plane absorption axis of Polarizing Plate No. 1, 10 or 11 was parallel to the in-plane slow axis of the IPS-mode liquid-crystal cell, to produce a liquid-crystal display device. The IPS-mode liquid-crystal cell having birefringence of 300 nm, in which the molecules could align horizontally under no voltage application thereto, was employed. As the liquid crystal, used was Merck's ZLI-4792.

Thus constructed, the transmittance of the liquid-crystal display device under no voltage application thereto, or that is, in the black state was measured at a polar angle of 60 degrees and at an azimuth angle of 45 degrees. As a result, the transmittance of the liquid-crystal display device comprising Polarizing Plate No. 10 of Example 1 was 0.02%, and that of the liquid-crystal display device comprising Polarizing Plate No. 11 of Example 2 was 0.02%; while that of the liquid-crystal display device comprising Polarizing Plate No. 1 of Comparative Example 1 was 0.035%. From these, it is understandable that the transmittance in the black state of the device employing Polarizing Plate No. 10 or 11 of Example of the invention was smaller and therefore the contrast of the device of Example of the invention was more improved, as compared with the device employing Polarizing Plate No. 1 of Comparative Example 1.

According to the invention, it is possible to provide a novel polarizing plate capable of functioning as a wide viewing angle polarizing plate for a whole visible wavelength range.

According to the invention, it is also possible to provide a novel transparent film, which may be used as a protective film for such a polarizing plate or as an optically-compensatory film in a liquid-crystal display device, capable of contributing to reducing both the wavelength dependency and the viewing angle dependency of the polarizing plate and the device.

According to the invention, it is also possible to provide a liquid-crystal display device having good viewing angle characteristics, improved in terms of contrast and color shift depending on the viewing angle.

The invention claimed is:

1. A transparent film exhibiting in-plane optical anisotropy, wherein its circular retardance (CRE1) as measured for the incident light in the normal direction of the film surface is nearly equal to 0 (zero);

the absolute values of its circular retardance (CRE2), as measured for the incident light going into the film at a polar angle of 60 degrees relative to the normal direction of the film surface in four directions at an azimuth angle of 45 degrees, 135 degrees, 225 degrees and 315 degrees, provided that the in-plane slow axis is at an azimuth angle of 0 degree, are not 0 (zero) and nearly equal to each other; and the absolute values of CRE2 fall within the range from 32 to 38 nm.

2. A polarizing plate comprising a polarizing film and a transparent film as set forth in claim 1.

3. A liquid-crystal display device comprising a liquid-crystal cell, a polarizing film and a transparent film as set forth in claim 1.

4. The liquid-crystal display device of claim 3, wherein the transparent film is disposed between a liquid-crystal cell and a polarizing film.

* * * * *